(12) United States Patent
Dry et al.

(10) Patent No.: US 9,981,588 B2
(45) Date of Patent: May 29, 2018

(54) VEHICLE SEAT WITH SEALED INFLATION SYSTEM

(71) Applicant: Ford Global Technologies, LLC, Dearborn, MI (US)

(72) Inventors: Alan George Dry, Grosse Pointe Woods, MI (US); Joseph S. Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 14/918,984

(22) Filed: Oct. 21, 2015

(65) Prior Publication Data

US 2017/0113580 A1    Apr. 27, 2017

(51) Int. Cl.
*B60N 2/20*    (2006.01)

(52) U.S. Cl.
CPC .............. *B60N 2/914* (2018.02); *B60N 2/20* (2013.01)

(58) Field of Classification Search
CPC .................................. B60N 2/914; B60N 2/20
USPC ..................................................... 297/452.41
See application file for complete search history.

(56) References Cited

U.S. PATENT DOCUMENTS

| | | |
|---|---|---|
| 3,730,588 A | 5/1973 | Braun |
| 4,018,477 A | 4/1977 | Hogan |
| 4,316,631 A | 2/1982 | Lenz et al. |
| 4,536,030 A | 8/1985 | Sakurada et al. |
| 4,615,563 A * | 10/1986 | Kobayashi ............. A47C 7/022 297/284.11 |
| 4,629,248 A | 12/1986 | Mawbey |
| 4,909,568 A | 3/1990 | Dal Monte |
| 4,965,899 A | 10/1990 | Sekido et al. |
| 5,529,377 A | 6/1996 | Miller |
| 5,584,085 A | 12/1996 | Banko |
| 5,879,053 A | 3/1999 | Lux et al. |
| 6,036,265 A | 3/2000 | Cosentino |
| 6,234,578 B1 | 5/2001 | Barton et al. |
| 6,386,633 B1 | 5/2002 | Newton |
| 6,450,579 B1 | 9/2002 | Nylander et al. |
| 6,554,360 B1 | 4/2003 | Wilke et al. |
| 6,623,076 B2 | 9/2003 | Klingler |
| 6,865,825 B2 | 3/2005 | Bailey, Sr. et al. |
| 6,905,170 B2 | 6/2005 | McMillen et al. |

(Continued)

FOREIGN PATENT DOCUMENTS

DE           10158876 A1     6/2003
DE       102004017212 B3     6/2005

*Primary Examiner* — Anthony D Barfield
(74) *Attorney, Agent, or Firm* — Vichit Chea; Price Heneveld LLP

(57) ABSTRACT

A vehicle seat includes a sealed inflation system having first and second inflation bladders interconnected by first and second supply lines for exchanging an inflation medium therebetween. Each inflation bladder includes one or more outwardly extending pilot stems. A first valve assembly is operably coupled to the pilot stems and first the supply line. Compression of the second inflation bladder opens the first valve assembly, and compression of the first inflation bladder closes the first valve assembly. A second valve assembly is disposed on the second supply and is configured to open and close as a seatback of the vehicle seat moves from a folded position to an upright position. The first and second valve assemblies are external components to the sealed inflation system.

20 Claims, 7 Drawing Sheets

(56) References Cited

U.S. PATENT DOCUMENTS

| | | | |
|---|---|---|---|
| 6,912,748 B2 | 7/2005 | VanSickle | |
| 7,086,700 B2 | 8/2006 | Habedank | |
| 7,108,323 B2 | 9/2006 | Welch et al. | |
| 7,225,486 B2 | 6/2007 | Jackson, III | |
| 7,255,399 B2 | 8/2007 | White et al. | |
| 7,311,358 B2 | 12/2007 | White et al. | |
| 7,490,900 B2 | 2/2009 | Szczudrawa | |
| 7,874,618 B2 | 1/2011 | Kohl et al. | |
| 8,510,884 B2 | 8/2013 | Lee | |
| 8,944,504 B2 | 2/2015 | Zimmerman, II | |
| 9,211,824 B2 * | 12/2015 | Arant | B60N 2/914 |
| 9,527,417 B2 * | 12/2016 | Dry | B60N 2/914 |
| 2006/0061183 A1 | 3/2006 | White et al. | |
| 2011/0266855 A1 | 11/2011 | Zimmerman, II | |

* cited by examiner

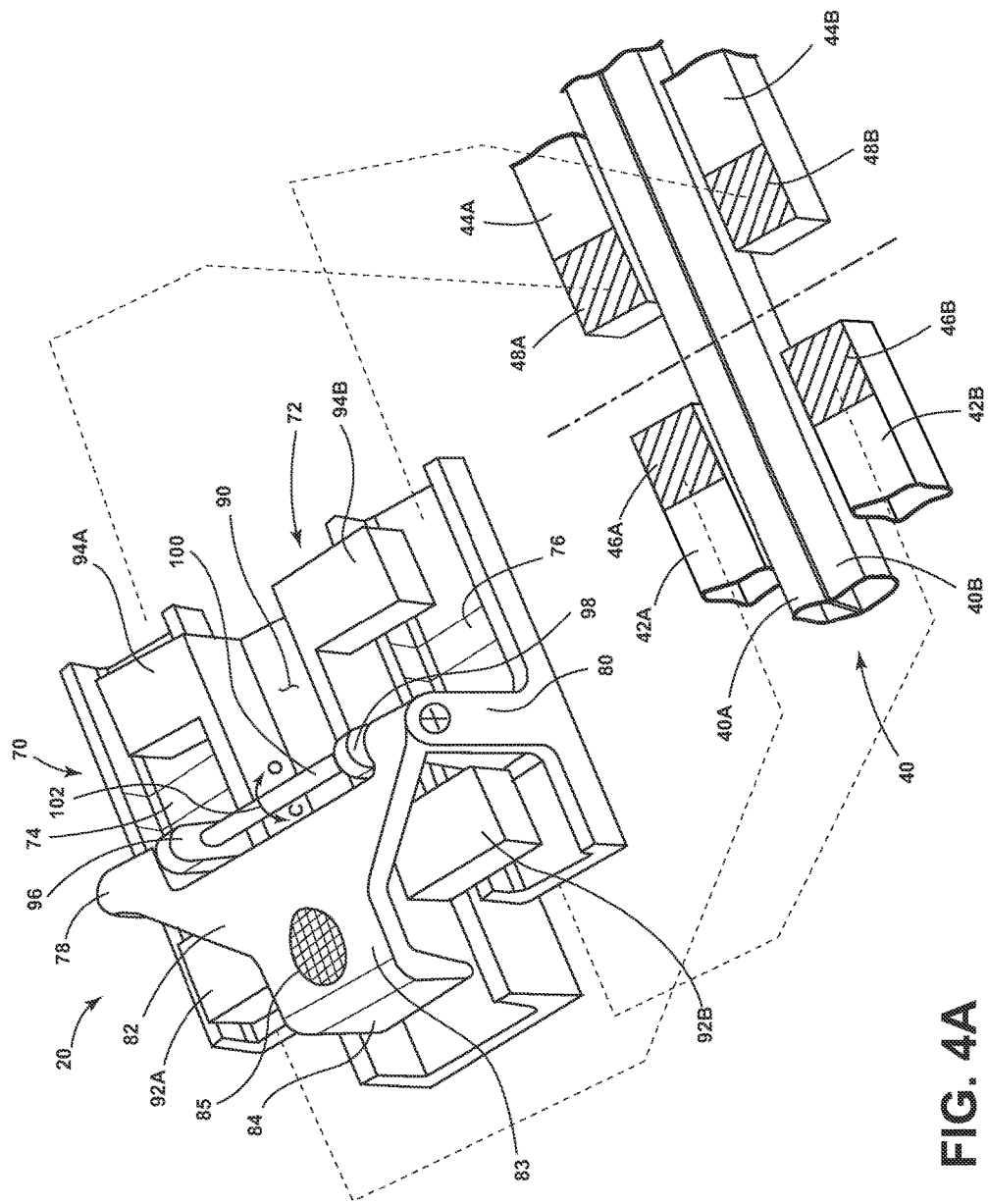

VEHICLE SEAT WITH SEALED INFLATION SYSTEM

FIELD OF THE INVENTION

The present invention generally relates to a vehicle seat having an air-suspended seat surface, and more particularly, to a vehicle seat having air bladders defining compressible portions with air-flow directing valves for facilitating a fold down movement of the seat.

BACKGROUND OF THE INVENTION

Vehicles may include foldable seats in which a seatback can be rotated in a downward direction into contact with a corresponding seat portion. Folding seats can be used in connection with, for example, the rear seats of a vehicle. The seatbacks can be folded, when not occupied by a passenger or the like, to accommodate a large object in the rear seat, or to expand the cargo area provided by the trunk of the vehicle. Due to ergonomic and other concerns, seatbacks and cushions may have contours and thicknesses that limit a user's ability to fold a seatback to a substantially flat orientation. This can result in a loading surface of the seatback, on which cargo is supported, to be angled significantly upward from an adjacent trunk surface. This is particularly true in adjustable vehicle seats having airs-suspended seat surfaces. This can impact both the useable cargo space, as well as the ability to reliably place objects on the sloped surface. Accordingly, improvements to foldable vehicle seats are desired that allow for a substantially flat loading surfaces.

SUMMARY OF THE INVENTION

One aspect of the present invention includes a vehicle seat having first and second inflation bladders disposed in a seat portion. First and second supply lines interconnect the first and second inflation bladders. A first valve assembly disposed on the first supply line is openable towards the first inflation bladder under pressure from the second inflation bladder. A second valve assembly disposed on the second supply line is openable towards the second inflation bladder by a downward folding movement of a seatback of the vehicle seat.

Another aspect of the present invention includes a vehicle seat having a sealed inflation system with first and second inflation bladders interconnected by a supply line for exchanging an inflation medium therebetween. Each inflation bladder includes one or more outwardly extending pilot stems. A valve assembly is operably coupled to the pilot stems and the supply line and is operable between open and closed positions. Compression of the second inflation bladder opens the valve assembly, and compression of the first inflation bladder closes the valve assembly.

Yet another aspect of the present invention includes a vehicle seat having a seat portion and a seatback pivotally coupled to the seat portion between upright and folded positions. The seatback includes a cam surface. A sealed inflation system is disposed in the seat portion and includes first and second inflation bladders. The first and second inflation bladders each include one or more pilot stems extending outwardly therefrom, and are interconnected by first and second supply lines configured to carry an inflation medium between the first and second inflation bladders. A first valve assembly is externally disposed on the first supply line and operably coupled to the one or more pressure stems of the first and second inflation bladders. Compression of the second inflation bladder inflates the one or more pilot stems of second inflation bladder to open the first valve assembly. Compression of the first inflation bladder inflates the one or more pilot stems of first inflation bladder to close the first valve assembly. A second valve assembly is externally disposed on the second supply line. The cam surface of the seatback engages the second valve assembly to close the second valve assembly when the seatback is in the upright position. The cam surface of the seatback disengages the second valve assembly when the seatback is in the folded position to open the second valve assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a perspective view of a non-return valve and an airflow passageway system with pilot stems exploded away therefrom;

DETAILED DESCRIPTION OF THE PREFERRED EMBODIMENTS

Figure 1:
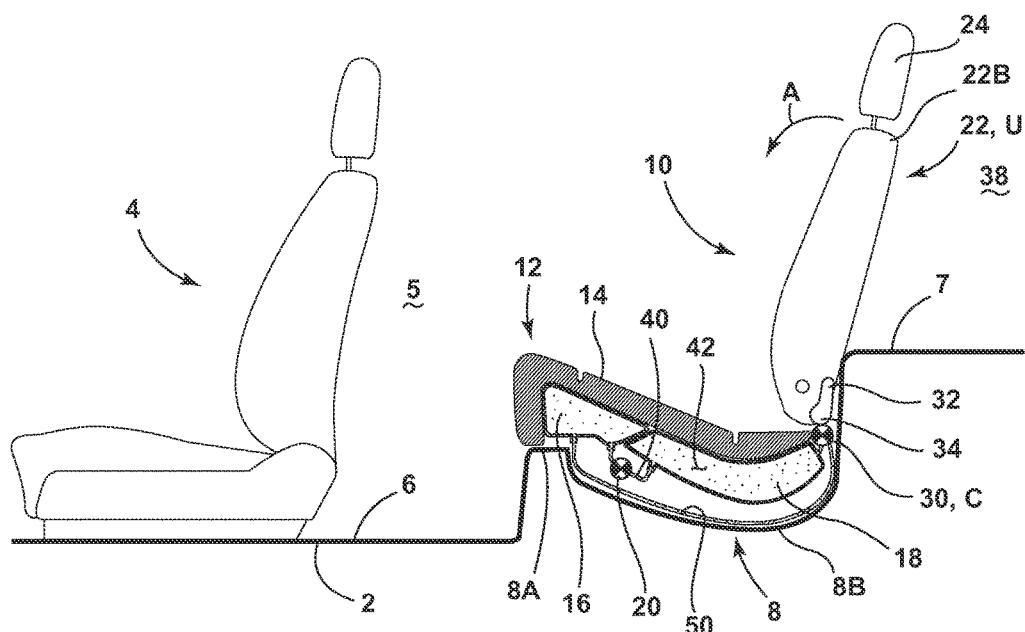
FIG. 1 is a side elevational view of a portion of a vehicle interior including a front vehicle seat and a foldable rear vehicle seat according to an embodiment of the disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring now to FIG. 1, a vehicle 2 is shown having a front vehicle seat 4 disposed within a vehicle interior 5. As further shown in FIG. 1, the reference numeral 10 generally designates a vehicle seat, and more particularly, a rear passenger vehicle seat disposed behind the front vehicle seat 4. The vehicle 2 generally includes a floor 6 having a trunk or cargo floor 7 and a seat pan 8 having a front portion 8A and a rear portion 8B. As shown in FIG. 1, the vehicle seat 10 is supported by the seat pan 8 and disposed adjacent to the trunk floor 7. The vehicle seat 10 includes a seat portion 12 having a cushion 14 disposed thereon. The cushion 14 may be a foam-like cushion, or may include a cover that is used to cover inflation bladders disposed in the seat portion 12. In the embodiment shown in FIG. 1, the vehicle seat 10 includes first and second inflation bladders 16, 18 having a first valve assembly 20 disposed therebetween. The first valve assembly 20 is contemplated to be a one-way or non-return valve used to control the flow of an inflation medium between the first and second inflation bladders 16, 18 in a dedicated direction, as further described below. The first valve assembly 20 is further contemplated to retain an open or closed condition until the valve assembly 20 is reset by an external circumstance, as further described below.

The first and second inflation bladders 16, 18 are contemplated to be part of a sealed inflation system 60 (FIG. 3) for suspending the seat portion 12 of the vehicle seat 10. The inflation bladders 16, 18 may be filled with air or other like fluid medium capable of transferring from one inflation bladder to another as a result of varied pressurizing events realized on the vehicle seat 10. The inflation bladders 16, 18 are described as being filled with an inflation medium, but for purposes of this disclosure, the inflation medium will be described herein as air, even though the present concept is not limited to an air inflation medium.

The first and second inflation bladders 16, 18 are contemplated to be components of a resilient pressurized system 60 (FIG. 3) that is sealed, as further described below. The first and second inflation bladders 16, 18 are contemplated to be constructed by blow molding or dielectric welding of preformed polymeric sheets or other like material. In essence, the first and second inflation bladders 16, 18 form a compressible pressure envelope that is made from generally thin walled resilient rubber like materials.

Figure 2A:
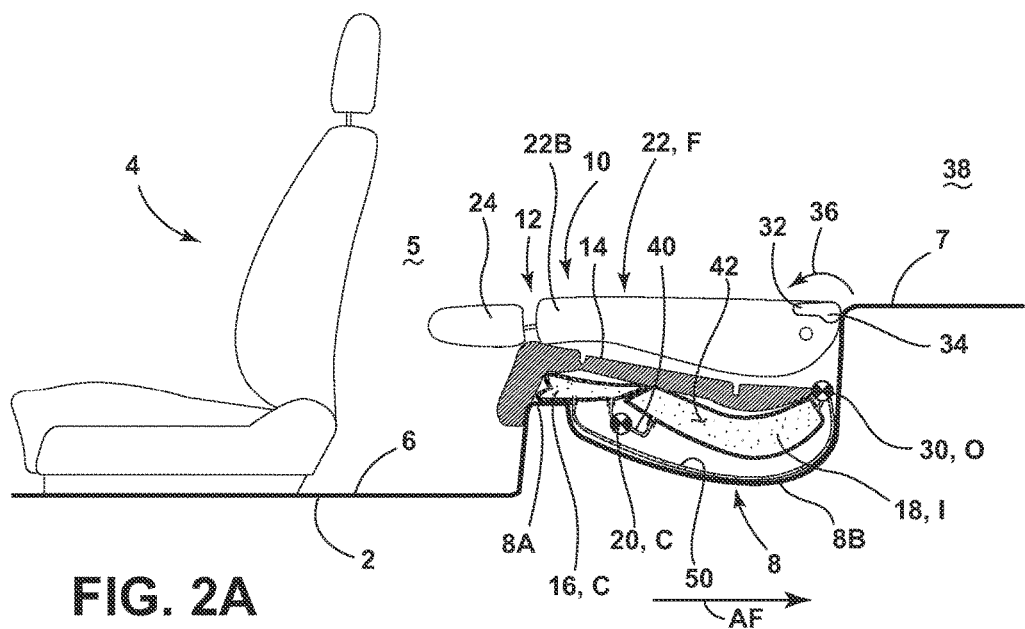
FIG. 2A is a side elevational view of the foldable rear vehicle seat of FIG. 1 with a seatback in a folded configuration.
Figure 2B:
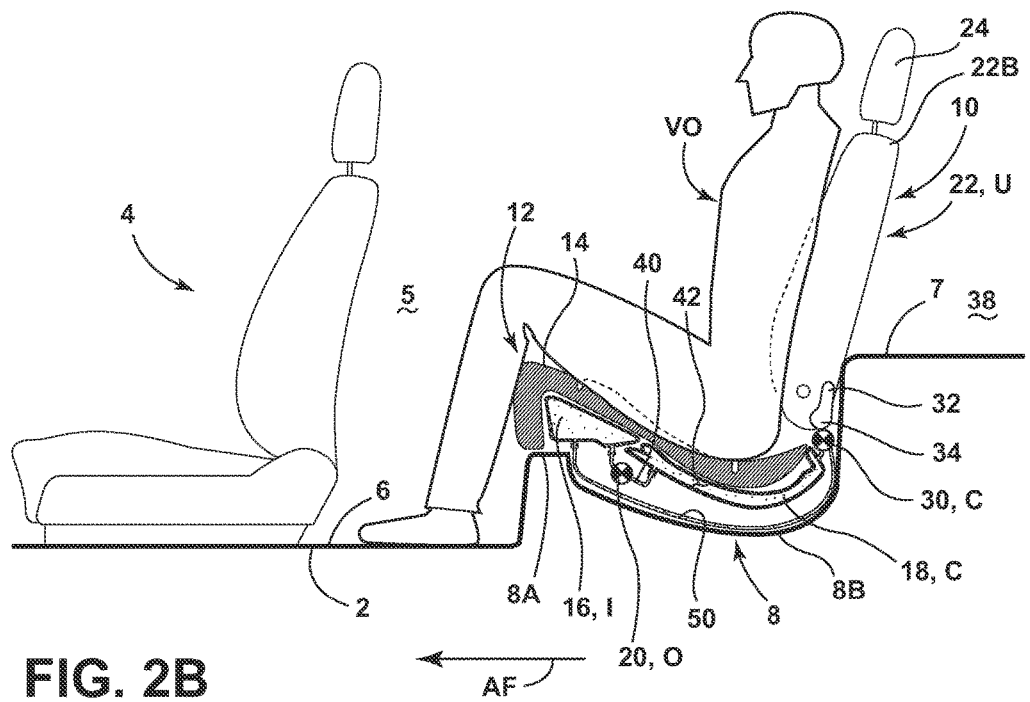
FIG. 2B is a side elevational view of the foldable rear vehicle seat of FIG. 1 with a passenger seated thereon.

The first and second inflation bladders 16, 18 are shown in FIG. 1 as being connected by first and second supply lines 40, 50, as further described below, which are contemplated to be comprised of a similar material as the first and second inflation bladders 16, 18 themselves. It is contemplated, in the configuration of FIG. 1, that the first inflation bladder 16 may be used to support a thigh of a seated vehicle occupant at an edge portion of the seat portion 12, while the second inflation bladder 18 may be used to support a seat of the vehicle occupant at a central portion of the seat portion 12 of the vehicle seat 10, as best shown in FIG. 2B. In this way, the first and second inflation bladders 16, 18 provide for an air-suspended seat surface at cushion 14 for a vehicle occupant. In FIG. 1, the first and second inflation bladders 16, 18 are shown with the first inflation bladder 16 disposed in a car-forward direction relative to the second inflation bladder 18. It is contemplated that the first and second inflation bladders 16, 18 may be disposed in any configuration within the seat portion 12 of the vehicle seat 10 and may include multiple inflation bladders as shown and described below with specific reference to FIG. 3.

As further shown in FIG. 1, the vehicle seat 10 includes a seatback 22 having a headrest 24 disposed on an upper portion 22B of the seatback 22. The seatback 22 is contemplated to be a folding seatback, such that the vehicle seat 10 is a folding vehicle seat. The seatback 22 is shown in the upright or use position U in FIG. 1 and is pivotally coupled to the seat portion 12 for movement to a folded position F (FIG. 2) along a path as indicated by arrow A. A second valve assembly 30 is shown disposed near the pivoting connection of the seatback 22 with the seat portion 12 of the vehicle seat 10. A cam or lever 32 is coupled to the seatback 22 at a lower portion thereof and includes a cam surface 34 disposed at an end portion thereof. The cam surface 34 is configured to contact and close the second valve assembly 30 when the seatback 22 is in the upright position U, thereby restricting air flow through the second valve assembly 30. The cam surface 34 of the lever 32 will disengage the second valve assembly 30 when the seatback 22 is moved to the folded position F, as shown in FIG. 2A, to open the second valve assembly 30. With the cam surface 34 of the lever 32 disengaging the second valve assembly 30, the second valve assembly 30 will open, such that air can flow from the first inflation bladder 16 to the second inflation bladder 18.

Referring now to FIG. 2A, the seatback 22 is shown in the folded position F, such that an angle 36 of the seatback 22 is substantially flat relative to the trunk floor 7. With the seatback 22 in the folded position F, the cargo area 38 is increased between the area occupied by the vehicle seat 10 and the trunk floor 7. Accordingly, the various features of vehicle seat 10 discussed herein may be particularly described with reference to a vehicle seat 10 positioned toward the rear of the associated vehicle 2, and may be implemented in connection with, for example, a rear, second-row, or third-row bench-style seat (such as 60/40 split-folding rear bench), rear, second-row, or third-row captain-style seats, or the like. Such features, however, may also be useable in connection with the front passenger seat 4.

Having the first and second inflation bladders 16, 18 in fluid connection with one another via the first supply line 40 and the second supply line 50, the seat portion 12 may include a profile that is customized for safe and comfortable travel by a vehicle occupant, as shown in FIG. 2B, but may also impede the ability of the seatback 22 to fully fold to a substantially flat position F, as shown in FIG. 2. The first supply line 40 allows for transfer of a flowable medium 42 between the first and second inflation bladders 16, 18 under various conditions. Both the first and second inflation bladders 16, 18 are contemplated to be generally compressible and flexible, such that the first and second inflation bladders 16, 18 can be inflated or expanded by various internal pressures imparted by the flowable medium 42 disposed therein, and can also be compressed by external pressures on the vehicle seat 10 at the seat portion 12. As shown in FIGS. 1 and 2A, the first supply line 40 interconnects the first inflation bladder 16 and the second inflation bladder 18 through first valve assembly 20. As further shown in FIGS. 1 and 2A, the second supply line 50 interconnects the first inflation bladder 16 to the second inflation bladder 18 through second valve assembly 30. The first inflation bladder 16, second inflation bladder 18, first supply line 40 and second supply line 50 are contemplated to be comprised of similar air impermeable materials (such as plastic, polyethylene, rubber, vinyl or other like material), such that these components define a closed or sealed inflation system 60 (FIG. 3) containing a fixed quantity of flowable medium 42 therein. In an example, the first inflation bladder 16 and second inflation bladder 18 can be configured to contain the flowable medium 42 at an internal pressure of about 3 pounds per square inch gauge ("p.s.i.g."). Such a system can be used to provide about one-third and one-half of such a maximum pressure in a range of about 0.5 p.s.i.g. and 1.0 p.s.i.g. Accordingly, an increase in external pressure imparted on either the first inflation bladder 16 or the second inflation bladder 18 can cause at least a portion of the flowable medium 42 to transfer from that structure to another structure via the first valve assembly 20 or the second valve assembly 30. In this way, the flowable medium 42 can transfer and increase the internal pressure of one inflation bladder by relieving the internal pressure of another inflation bladder that is fluidly connected thereto.

With further reference to FIG. 2A, the lever 32 of the seatback 22 is shown disengaged from the second valve assembly 30, such that the second valve assembly 30 is considered to be in an open position O. With the second valve assembly 30 in the open position O, the inflation medium 42 can rapidly move from the first inflation bladder 16 to the second inflation bladder 18 via second supply line 50. Second supply line 50 is contemplated to be a rapids transfer supply line that allows for rapid collapsing of the first inflation bladder 16 to ensure a flat seatback 22 in the folded position F. As shown in FIG. 2A, the first inflation bladder 16 is in a compressed condition C due to a force imparted by the upper portion 22B of the seatback 22 acting on the seat cushion 14 disposed adjacent to or above the first inflation bladder 16. When the first inflation bladder 16 is in the compressed condition C, the inflation medium 42, contemplated to be air, flows from the first inflation bladder 16 to the second inflation bladder 18 in a rapid manner through second supply line 50 and open second valve assembly 30. Thus, the second inflation bladder 18 is shown in FIG. 2A in an inflated condition I having received a portion of the inflation medium 42 formerly disposed in the first inflation bladder 16. As described above, the flow of the inflation medium 42 from the first inflation bladder 16 to the second inflation bladder 18 via second supply line 50 is only possible when the second valve assembly 30 is in an open position O, which is realized when the seatback 22 is in the folded position F, as shown in FIG. 2A. Thus, the air flow direction, indicated by arrow AF, moves in a car-rearward direction from the first inflation bladder 16 to the second inflation bladder 18 when the seatback 22 is in the folded position F. By exhausting the inflation medium 42 to the second inflation bladder 18 from the first inflation bladder 16, the seatback 22 can easily and rapidly move to the flat folded position F without resistance from the compressed inflation bladder 16.

Referring now to FIG. 2B, the vehicle seat 10 is shown with the seatback 22 in the upright position U, such that the lever 32 is acting on the second valve assembly 30 to move the second valve assembly 30 to the closed position C. In this way, the inflation medium 42 cannot transfer from the first inflation bladder 16 to the second inflation bladder 18 via second supply line 50. As shown in FIG. 2B, a vehicle occupant VO is shown seated in the vehicle seat 10, such that the second inflation bladder 18 is in a compressed condition C. When the second inflation bladder 18 is in the compressed condition C, the inflation medium 42 moves from the second inflation bladder 18 to the first inflation bladder 16 via first supply line 40 under pressure imparted by the vehicle occupant VO. Thus, it is contemplated that the first valve assembly 20 is in the open position O when the second inflation bladder 18 is in the compressed condition C. As further shown in FIG. 2B, the first inflation bladder 16 is in the inflated condition I having received a portion of the inflation medium 42 formerly disposed in the second inflation bladder 18. This is due to the fact that, as noted above, the inflation system 60 of the present concept is a sealed system, wherein the compression of one inflation bladder leads to the inflation of another through the supply lines and valve assemblies of the closed or sealed inflation system 60. Thus, as shown in FIG. 2B, with the vehicle occupant VO seated in vehicle seat 10, the air flow direction indicated by arrow AF is shown in a car-forward direction from second inflation bladder 18 to first inflation bladder 16.

Figure 3:
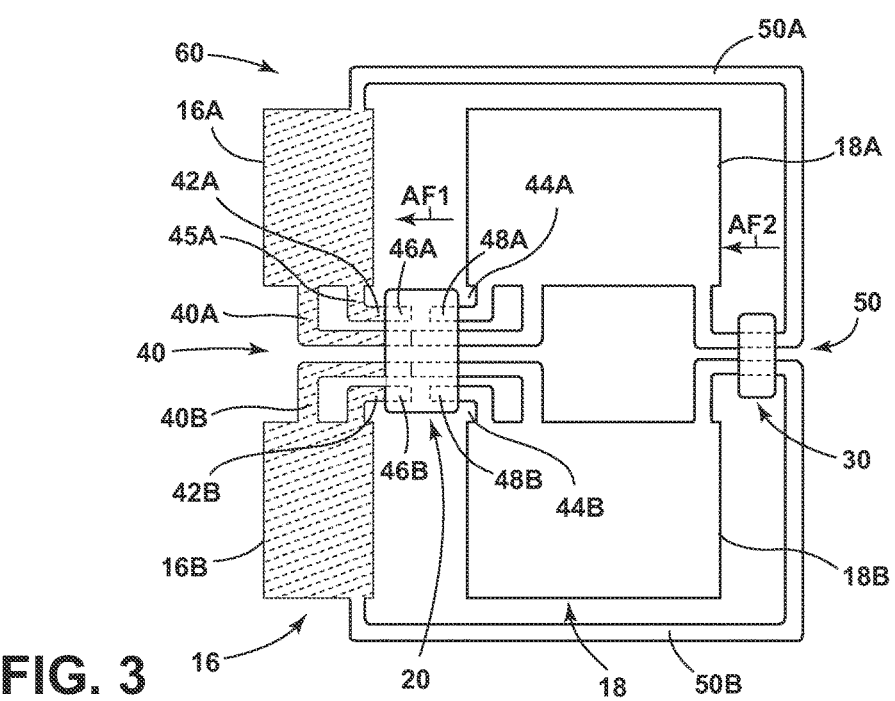
FIG. 3 is a schematic top plan view of an air inflation system.

Referring now to FIG. 3, an embodiment of the sealed inflation system 60 is shown, wherein the first inflation bladder 16 includes two substantially similar inflation bladders 16A, 16B, and further wherein the second inflation bladder 18 includes two substantially similar inflation bladders 18A, 18B. The first supply line 40 is shown having two supply lines 40A, 40B which fluidically connect inflation bladder 16A to inflation bladder 18A and inflation bladder 16B to inflation bladder 18B, respectively. As further shown in FIG. 3, the supply lines 40A, 40B are disposed through the first valve assembly 20 to control the air flow between the first and second sets of inflation bladders 16, 18. As shown in FIG. 3, the air flow direction across the first valve assembly 20 is indicated by arrow AF1 in a car-forward direction from the second inflation bladders 18A, 18B to the first inflation bladders 16A, 16B. The first inflation bladders 16A, 16B further include pilot stems 42A, 42B, respectively, which are also engaged with the first valve assembly 20. The second inflation bladders 18A, 18B also include pilot stems 44A, 44B which are also engaged with the first valve assembly 20. As used throughout this disclosure, the term "pilot stems" is meant to include a portion of an associated air bladder in the form of a closed-off tube which extends outwardly from the associated air bladder. For example, with specific reference to pilot stem 42A of inflation bladder 16A, the pilot stem 42A includes a first end 45A which opens into inflation bladder 16A and is in fluid communication therewith. The pilot stem 42A further includes a second end 46A which is a closed-off end portion engaged with the first valve assembly 20. The remaining pilot stems 42B, 44A, 44B are similarly configured with their associated inflation bladders having end portions 46B, 48A, and 48B, respectively. The end portions 46A, 46B, 48A and 48B of the pilot stems 42A, 42B, 44A and 44B are configured to control the condition of the first valve assembly 20 between open and closed conditions. When the first valve assembly 20 is in the open condition O, as shown in FIG. 2B, the air flow direction across the first valve assembly 20 is in a car-forward direction as indicated by arrow AF1 from the second inflation bladders 18A, 18B to the first inflation bladders 16A, 16B. The end portions 46A, 46B, 48A and 48B of the pilot stems 42A, 42B, 44A and 44B, respectively, are pressurized, such that the first valve assembly 20 can open and close based on inflation of either set of pilot stems 42A, 42B and 44A, 44B. The operation of the pilot stems 42A, 42B, 44A and 44B for controlling the open or closed position of the first valve assembly 20 is further described below with specific reference to FIGS. 4A-4D.

As further shown in FIG. 3, the second valve assembly 30 has rapids exhaust supply lines 50A, 50B of the second supply line 50 disposed therethrough. As noted above, the second supply line 50 interconnects the first inflation bladder 16 with the second inflation bladder 18, and is shown in FIG. 3 connecting dual sets of inflation bladders 16A, 16B and 18A, 18B via separate supply lines 50A, 50B. Air flow across the second valve assembly 30 is shown in FIG. 3 as being in a car-forward direction as indicated by arrow AF2. Arrow AF2 indicates an air flow direction across the second valve assembly 30 in a schematic representation only, similar to air flow indicator AF1. Actual air flow directions may be different in assembly, however, the first valve assembly 20 will allow air to flow from the second inflation bladder 18 to the first inflation bladder 16 when in an open condition O, and the second valve assembly will allow air to flow from the first inflation bladder 16 to the second inflation bladder 18 when in an open condition O, as described above. The configuration of the closed inflation system 60 shown in FIG. 3 is exemplary only, and the first inflation bladder 16 may include a plurality of inflation bladders beyond inflation bladders 16A, 16B. Further, the second inflation bladder 18 may include a plurality of inflation bladders beyond inflation bladders 18A, 18B shown in FIG. 3. The number and configuration of the inflation bladders shown in FIG. 3 is exemplary only and may be configured in any way as dictated by the functionality of a particular vehicle seat.

Referring now to FIG. 4A, an embodiment of the first valve assembly 20 is shown having supply lines 40A, 40B and pilots stems 42A, 42B, 44A and 44B exploded away therefrom. The first valve assembly 20 is a two-piece molded valve assembly which includes a base portion 70 pivotally connected to an engagement portion 72. The base portion 70 includes first and second troughs 74, 76 disposed on opposite sides of the engagement portion 72. Arms 78 and 80 upwardly extend from the first and second troughs 74, 76, respectively. A pinch blade 82 extends laterally from the arms 78, 80 and includes a downwardly extending blade portion 84 disposed over a central channel 90 of the engagement portion 72. The engagement portion 72 includes the central channel 90 having engagement members 92A, 92B, 94A and 94B extending outwardly therefrom. As shown in FIG. 4A, engagement members 92A and 94A are disposed over the first trough 74 of the base portion 70, while engagement members 92B and 94B are disposed over the second trough 76 of the base portion 70. Arms 96 and 98 upwardly extend from the central channel 90 of the engagement portion 72 and are interconnected with arms 78, 80 of the base portion 70 via pivot rod 100. Thus, the base portion 70 and engagement portion 72 are configured to pivot relative to one another between open and closed positions O, C along a path as indicated by arrow 102. As further shown in FIG. 4A, the pinch blade 82 of the base portion 70 includes a generally planar top portion 83 from which the blade portion 84 downwardly extends. A target location is identified as reference numeral 85 in FIG. 4A and is configured to engage a biasing mechanism to bias the pinch blade 82 in a downward direction towards the closed position.

Figure 4B:
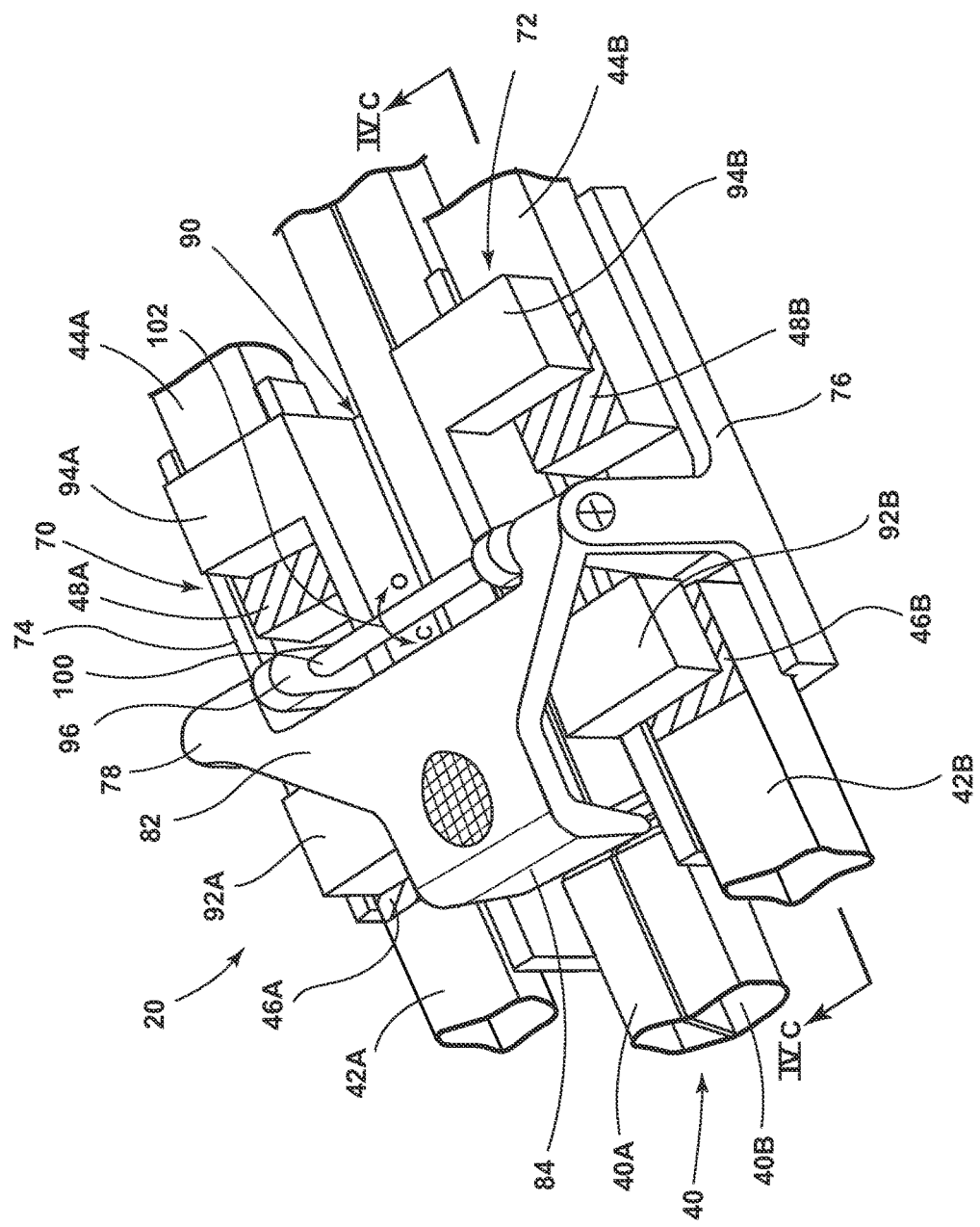
FIG. 4B is a perspective view of the non-return valve and airflow passageway system with pilot stems of FIG. 4A in an assembled condition.

With further reference to FIG. 4A, the first supply line 40 is shown having supply lines 40A, 40B disposed centrally relative to pilot stems 42A, 42B, 44A and 44B. The end portions 46A, 46B, 48A and 48B of the pilot stems 42A, 42B, 44A and 44B include shaded areas in FIG. 4A representing target zones for alignment and engagement with the engagement members 92A, 92B, 94A and 94B of the engagement portion 72 of the first valve assembly 20. The first and second troughs 74, 76 of the base portion 70 are generally upwardly opening U-shaped troughs configured to receive the pilot stems 42A, 42B, 44A and 44B in a manner as shown in FIG. 4B. The central channel 90 of the engagement portion 72 is a generally upwardly opening U-shaped channel configured to receive supply lines 40A and 40B therein, as shown in FIG. 4B.

Referring now to FIG. 4B, the first valve assembly 20 is shown having the pilot stems 42A, 42B, 44A and 44B and supply lines 40A, 40B disposed therein. With specific reference to the first trough 74, pilot stems 42A and 44A are shown disposed therein on opposite sides of the first trough 74. As configured in FIG. 4B, engagement member 92A is disposed over end portion 46A of pilot stem 42A. Similarly, engagement member 94A is disposed over end portion 48A of pilot stem 44A. With respect to the second trough 76, engagement member 92B is disposed over end portion 46B of pilot stem 42B, and engagement member 94B is disposed over end portion 48B of pilot stem 44B. Being pressurized or inflatable pilot stems, the pilot stems 42A, 42B, 44A and 44B of the present concept are configured to engage the engagement members 92A, 92B, 94A and 94B of the engagement portion 72 of the first valve assembly 20 to open and close the first valve assembly 20. The pilot stems 42A, 42B, 44A and 44B are resilient members configured to inflate based on a pressurization or compression of an inflation bladder associated with the pilot stems 42A, 42B, 44A and 44B. The articulation of the first valve assembly 20 between open and closed positions will now be described with reference to FIGS. 4C and 4D.

Figure 4C:
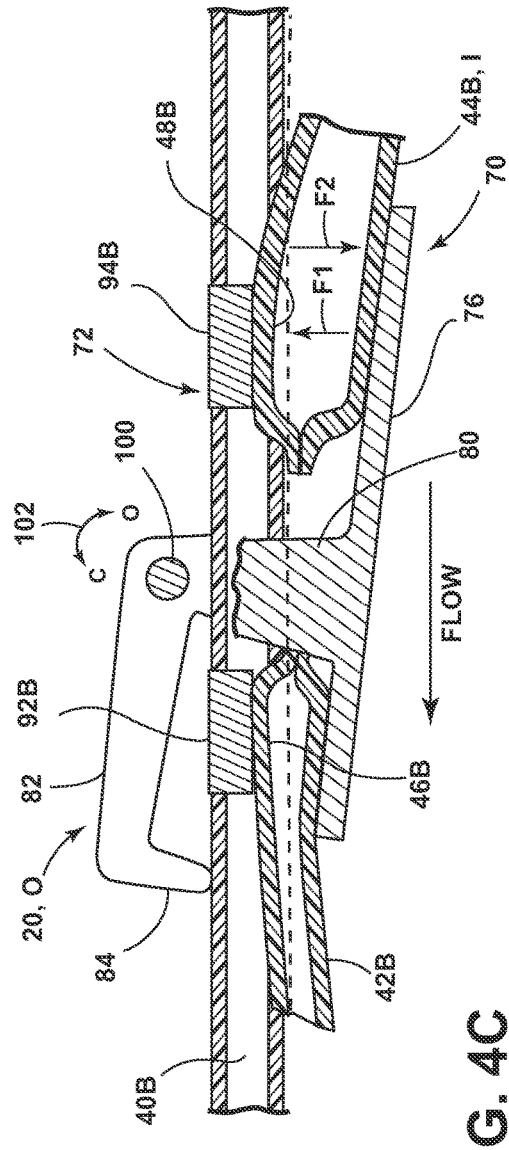
FIG. 4C is a crossectional view of the valve assembly of FIG. 4B taken at line IVC showing the valve assembly in an open condition.

Referring now to FIG. 4C, a cross-section of the first valve assembly 20 is shown with the first valve assembly 20 in the open position O. Thus, it is contemplated that the base portion 70 and engagement portion 72 have pivoted or articulated with respect to one another along the path as indicated by arrow 102 to the open position O by an inflation condition I of the pilot stem 44B. Thus, in the configuration shown in FIG. 4C, it is contemplated that pressure is being realized on the second inflation bladder 18, such that the second inflation bladder 18 is in a compressed condition C, such as shown in FIG. 2B. With the second inflation bladder 18 in the compressed condition C, the pilot stem 44B is in the inflated condition I, such that end portion 48B of pilot stem 44B engages engagement member 94B of the engagement portion 72 by imparting an upward force F1 on an underside of the engagement member 94B. By imparting the upward force F1 on the engagement feature 94B, the end portion 48B of the pilot stem 44B provides a downward force F2 on the second trough 76 of the base portion 70 to rotate or pivot the base portion 70 and the engagement portion 72 away from one another. With the base portion 70 rotated towards the open position O, the pinch blade 82 is lifted, such that the blade portion 84 is disposed above supply line 40B. In this configuration, air can flow in the direction as indicated in FIG. 4C from the compressed second inflation bladder 18 to the first inflated inflation bladder 16. Thus, when an internal pressure in the first inflation bladder 16 is low and an internal pressure in the second inflation bladder 18 is high, the pinch blade 82 lifts to open supply line 40B, thereby allowing the first inflation bladder 16 to inflate from air driven by the compression of the second inflation bladder 18.

Figure 4D:
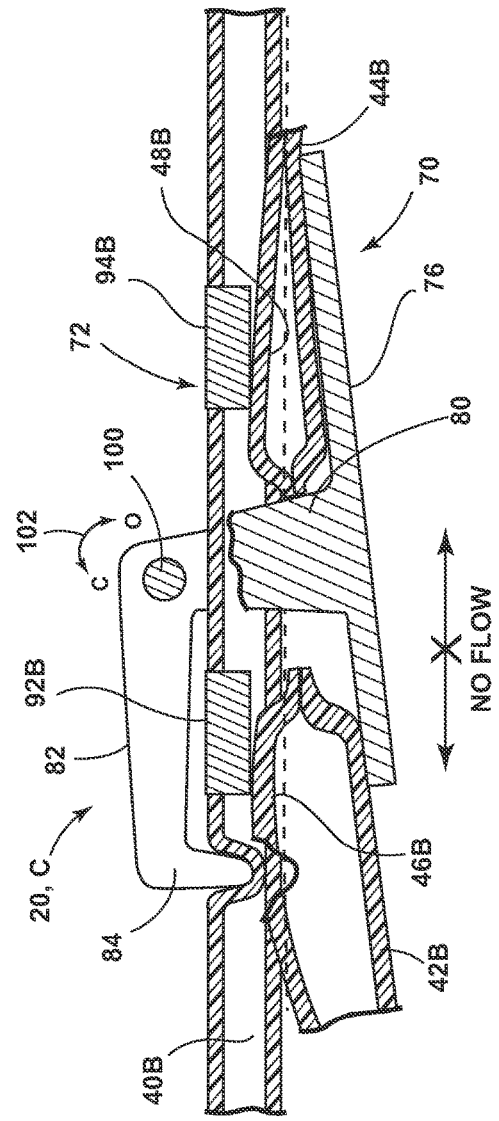
FIG. 4D is a crossectional view of the valve assembly of FIG. 4B taken at line IVC showing the valve assembly in a closed condition.

With specific reference to FIG. 4D, a cross-section of the first valve assembly 20 is shown with the first valve assembly 20 in the closed position C. Thus, it is contemplated that the base portion 70 and engagement portion 72 have pivoted or articulated with respect to one another along the path as indicated by arrow 102 to the closed position C by an inflation condition I of the pilot stem 42B. Thus, in the configuration shown in FIG. 4D, it is contemplated that pressure has equalized between inflation bladder 16 and inflation bladder 18. This is likely the case when the vehicle occupant VO is in a fully seated position and all necessary air has transferred from inflation bladder 18 to inflation bladder 16 as shown in FIG. 2B. As noted above, the pinch blade 82 includes generally planar top portion 83 having a target location 85 for engagement with a biasing mechanism, wherein the biasing mechanism is configured to urge the pinch blade downward to the closed position C. In this way, the blade portion 84 pinches supply line 40B shut. With supply line 40B pinched shut due to the first valve assembly 20 being in the closed position C, air cannot flow from the second inflation bladder 18 to the first inflation bladder 16. Being a one-way non-return valve, the first valve assembly 20 remains closed despite increasing pressure in the first inflation bladder 16. Thus, when an internal pressure in the first inflation bladder 16 is high and an internal pressure in the second inflation bladder 18 is low, the pinch blade 82 is forced down tightly to internally seal off supply line 40B.

Thus, as shown in FIGS. 4C and 4D, the first valve assembly 20 self regulates between open and closed positions O, C dependent on the relative pressures of first and second inflation bladders 16, 18. In this way, the first valve assembly 20 makes the use of a double pilot system to ensure that a high pressure in second inflation bladder 18 will always push the inflation medium 42 into the first inflation bladder 16, but that no matter how high the internal pressure is in the first inflation bladder 16, the first valve assembly 20 will never open and back flow from the first inflation bladder 16 into the second inflation bladder 18. It is further contemplated that the first valve assembly 20 will be closed at all times when the internal pressure of the first inflation bladder 16 exceeds or equals the internal pressure of the second inflation bladder 18.

Figure 5A:
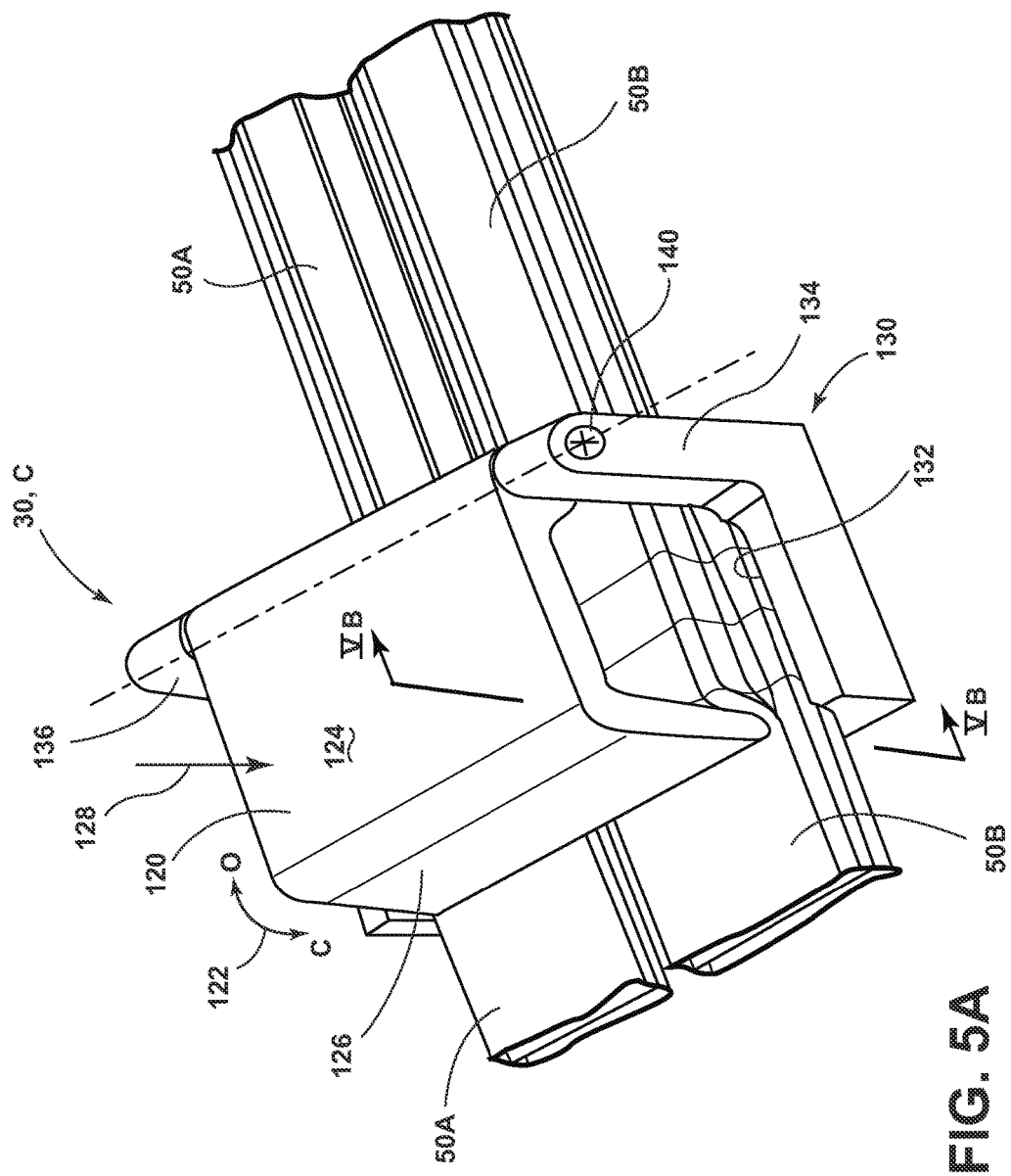
FIG. 5A is a perspective view of an open/close valve assembly in a closed condition.

Referring now to FIG. 5A, the second valve assembly 30 is shown in a closed position C, wherein a pinch blade 120 is closed on supply lines 50A and 50B to prevent air flow from the first inflation bladder 16 to the second inflation bladder 18. The second valve assembly 30 includes the pinch blade 120 which is configured to pivot in a direction as indicated by arrow 122 between open and closed positions relative to a base portion 130. The pinch blade 120 includes a blade portion 126 that downwardly extends from an upper engagement surface 124. The blade portion 126 is shown in FIG. 5A as compressing against the supply lines 50A, 50B to close the supply lines 50A, 50B. The upper engagement surface 124 of the pinch blade 120 is a generally planar surface configured to engage the lever 32 when the seatback 22 is in the upright position U as shown in FIG. 1. The lever 32 is configured to act on the upper engagement surface 124 of the pinch blade 120 in a downward direction as indicated by arrow 128 to close the second valve assembly 30. Thus, the lever 32 acts as a cam while the upper engagement surface 124 of the pinch blade 120 acts as a cam follower for driving the pinch blade 120 to the closed position C from the open position O as conditioned by movement of the seatback 22.

As further shown in FIG. 5A, the base portion 130 includes a central channel 132 in which supply lines 50A, 50B are received. The base portion 130 includes upwardly extending arms 134, 136 which are pivotally coupled to the upper engagement surface 124 of the pinch blade 120 via a pivot rod 140. Thus, with the second valve assembly 30 in the closed position C as shown in FIG. 5A, there is no air flow permitted in supply lines 50A, 50B in a right-to-left direction. In this way, air is blocked from entering the second inflation bladder 18 from the first inflation bladder 16. As noted above, when the seatback 22 of the vehicle seat 10 is in the upright position U, the second valve assembly 30 is in the closed position C and the first valve assembly 20 will convert to the open position O when a vehicle occupant VO is seated on the seat portion 12 of the vehicle seat 10 as shown in FIG. 2B. With the first valve assembly 20 in the open position O and the second valve assembly 30 in the closed position C, air flow can only move in a car-forward direction from the second inflation bladder 18 to the first inflation bladder 16 in the direction as indicated by arrow AF in FIG. 2B.

Figure 5B:
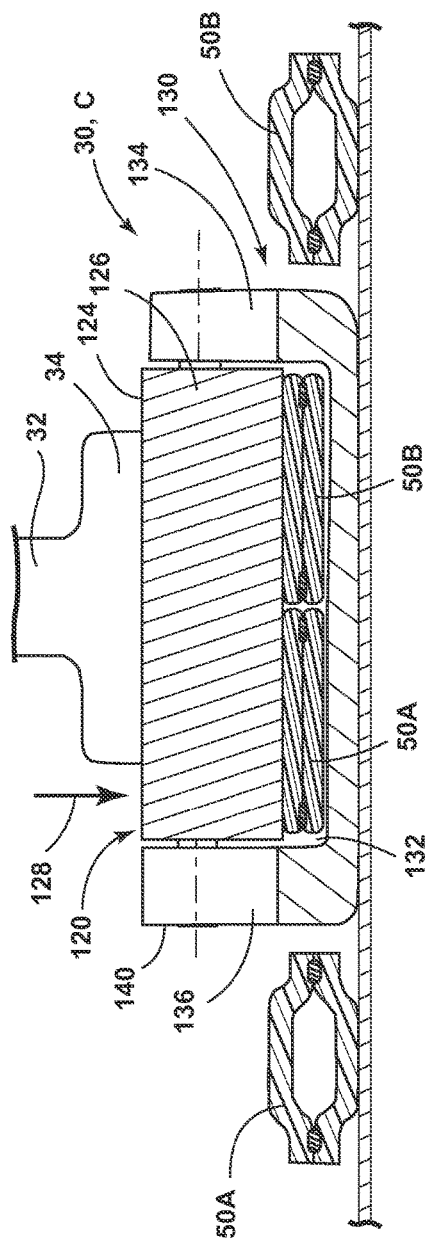
FIG. 5B is a crossectional view of the valve assembly of FIG. 5A taken at line VB showing the valve assembly in a closed condition.

Referring now to FIG. 5B, the second valve assembly 30 is shown in the closed position C with the lever 32 acting on the engagement surface 124 of the pinch blade 120 at cam surface 34 of the lever 32. As noted above, the lever 32 engages the pinch blade 120 to drive the pinch blade 120 in a downward direction as indicated by arrow 128 to close the supply lines 50A, 50B via the blade portion 126 of the pinch blade 120. As further noted above, the engagement of the lever 32 and the pinch blade 120 occurs when the seatback 22 is in the upright position U, as shown in FIG. 1. In FIG. 5B, the supply lines 50A, 50B disposed within the second valve assembly 30 are pinched shut so that there is no air flow from the first inflation bladder 16 to the second inflation bladder 18. In FIG. 5B, supply lines 50A, 50B disposed outside of the valve assembly 30 are shown in an open condition and represent the supply lines running between the first inflation bladder 16 and the valve assembly 30, as shown in FIG. 3.

Figure 5C:
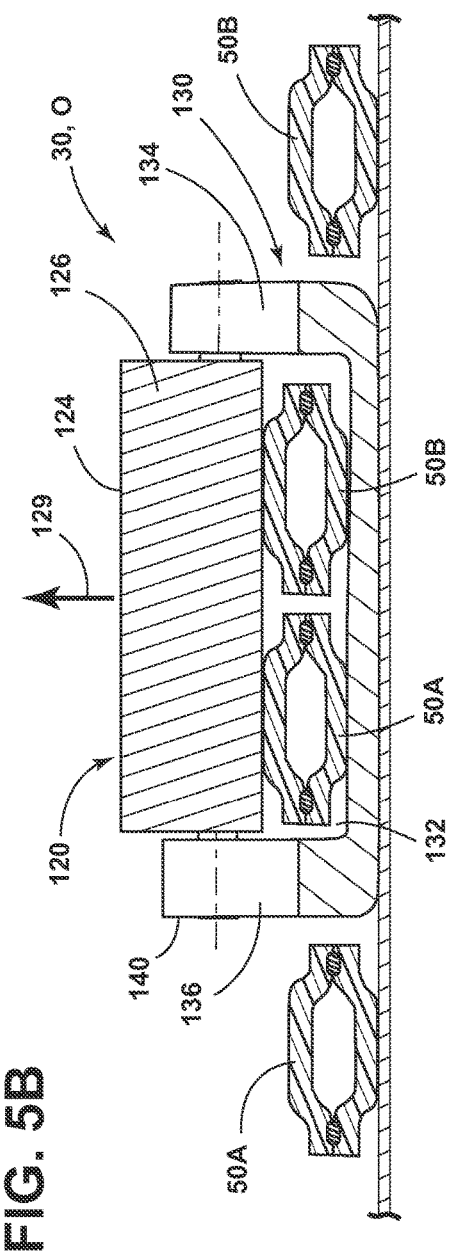
FIG. 5C is a crossectional view of the valve assembly of FIG. 5A taken at line VB showing the valve assembly in an open condition.

Referring now to FIG. 5C, the second valve assembly 30 is shown in the open condition O, with the pinch blade 120 in a raised condition relative to FIG. 5B. With the pinch blade 120 in the raised condition, the blade portion 126 is disposed above the supply lines 50A, 50B disposed in the central channel 132 of the base portion 130. Thus, when the pinch blade 120 is raised in a direction as indicated by arrow 129, the second valve assembly 30 is in the open position O, such that supply lines 50A, 50B allow for air to flow from the first inflation bladder 16 to the second inflation bladder 18. The pinch blade 120 is contemplated to be biased to the upward or open position, and is moved thereto when the lever 32 of the seatback 22 is removed from engagement with the engagement surface 124 of the pinch blade 120. Thus, when the seat is folded down in a position as indicated in FIG. 2A, the second valve assembly 30 is in the open position O as shown in FIG. 5C to permit air flow in the direction as indicated by arrow AF in FIG. 2A.

The first and second valve assemblies 20, 30 are shown in FIGS. 4A-4D and 5A-5C, respectively as external or peristaltic valves. As used herein the term "peristaltic" refers to an external assembly operating by compression means. Thus, the first and second valve assemblies 20, 30 are external or peristaltic valves that are suited to the resilient pressurized and sealed inflation system 60 of the present concept. In this way, the first and second valve assemblies 20, 30 can achieve an internal pressure seal within the sealed inflation system 60 by using external forces and without penetration of the sealed inflation system 60.

Thus, the peristaltic air valves in resilient air suspended seat system of the present concept are configured to externally control air flow within resilient channels without penetrating the resilient channels so as to eliminate potential leakage sites that commonly occur in systems using inserted in-line valves.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle seat, comprising:
   first and second inflation bladders disposed in a seat portion;
   first and second supply lines interconnecting the inflation bladders;
   a first valve assembly disposed on the first supply line and openable towards the first inflation bladder under pressure from the second inflation bladder; and
   a second valve assembly disposed on the second supply line and openable towards the second inflation bladder by a downward folding movement of a seatback.

2. The vehicle seat of claim 1, wherein the second valve assembly includes a base portion having a pinch blade pivotally coupled thereto, wherein the pinch blade includes an upper engagement surface.

3. The vehicle seat of claim 2, wherein the seatback includes a cam surface configured to engage the upper engagement surface of the pinch blade to close the second valve assembly when the seatback is in an upright position.

4. The vehicle seat of claim 1, wherein the first valve assembly is a non-return valve assembly operable between open and closed positions relative to a condition of the first and second inflation bladders.

5. The vehicle seat of claim 4, wherein the first valve assembly is in the closed position when the first inflation bladder is in a compressed condition.

6. The vehicle seat of claim 5, wherein the first valve assembly is in the open position when the second inflation bladder is in a compressed condition to allow for movement of an inflation medium from the second inflation bladder to the first inflation bladder via the first supply line.

7. The vehicle seat of claim 1, wherein the second valve assembly is in an open position when the first inflation bladder is in a compressed condition to allow for movement of an inflation medium from the first inflation bladder to the second inflation bladder.

8. A vehicle seat, comprising:
   a sealed inflation system having first and second inflation bladders interconnected by a supply line for exchanging an inflation medium therebetween, each inflation bladder including one or more pilot stems extending outwardly therefrom; and
   a valve assembly operably coupled to the pilot stems and the supply line, wherein compression of the second inflation bladder opens the valve assembly, and further wherein compression of the first inflation bladder closes the valve assembly.

9. The vehicle seat of claim 8, wherein the valve assembly includes a base portion having first and second troughs disposed on opposite sides of a pinch blade, and further wherein the one or more pilot stems of the first and second inflation bladders are received in the first and second troughs of the base portion.

10. The vehicle seat of claim 9, wherein the valve assembly includes an engagement portion pivotally coupled to the base portion, the engagement portion having a plurality of engagement members disposed over the one or more pilot stems of the first and second inflation bladders as received the first and second troughs of the base portion, and further wherein the supply line is received in a central channel of the engagement portion disposed below the pinch blade of the base portion.

11. The vehicle seat of claim 10, wherein the pinch blade closes the supply line when the first inflation bladder is compressed and the one or more pilot stems of the first inflation bladder are inflated.

12. The vehicle seat of claim 11, wherein the pinch blade is raised above the supply line when the second inflation bladder is compressed and the one or more pilot stems of the second inflation bladder are inflated.

13. The vehicle seat of claim 8, wherein the first inflation bladder includes one or more inflation bladders disposed near an edge of a seat portion of the vehicle seat.

14. The vehicle seat of claim 13, wherein the second inflation bladder includes one or more inflation bladders disposed in a central portion of the seat portion of the vehicle seat.

15. The vehicle seat of claim 8, wherein the valve assembly defines a first valve assembly and the supply line defines a first supply line, and further wherein a second valve assembly is disposed on a second supply line interconnecting the first and second inflation bladders.

16. The vehicle seat of claim 15, wherein the second valve assembly opens to allow an inflation medium to exhaust from the first inflation bladder to the second inflation bladder through the second supply line when the first inflation bladder is in a compressed condition.

17. The vehicle seat of claim 16, wherein the second valve assembly includes an engagement surface configured to close the second valve assembly when a cam surface of a seatback acts on the engagement surface as the seatback moves to an upright position.

18. A vehicle seat, comprising:
a seat portion;
a seatback pivotally coupled to the seat portion between upright and folded positions, wherein the seatback includes a cam surface disposed thereon;
a sealed inflation system disposed in the seat portion, the inflation system comprising:
   first and second inflation bladders, each having one or more pilot stems extending outwardly therefrom, wherein the first and second inflation bladders are interconnected by first and second supply lines configured to carry an inflation medium between the first and second inflation bladders;
   a first valve assembly disposed externally on the first supply line and operably coupled to the one or more pressure stems of the first and second inflation bladders, wherein compression of the second inflation bladder inflates the one or more pilot stems of the second inflation bladder to thereby open the first valve assembly, and further wherein compression of the first inflation bladder inflates the one or more pilot stems of the first inflation bladder to thereby close the first valve assembly; and
   a second valve assembly disposed externally on the second supply line, wherein the cam surface of the seatback engages the second valve assembly to close the second valve assembly when the seatback is in the upright position, and further wherein the cam surface of the seatback disengages the second valve assembly when the seatback is in the folded position to open the second valve assembly.

19. The vehicle seat of claim 18, wherein the first valve assembly is a non-return valve including a base portion having first and second troughs disposed on opposite sides of a pinch blade, and further wherein the one or more pilot stems of the first and second inflation bladders are received in the first and second troughs of the base portion.

20. The vehicle seat of claim 19, wherein the first valve assembly includes an engagement portion pivotally coupled to the base portion, the engagement portion having a plurality of engagement members disposed over the one or more pilot stems of the first and second inflation bladders as received the first and second troughs of the base portion, and further wherein the first supply line is received in a central channel of the engagement portion disposed below the pinch blade of the base portion.

\* \* \* \* \*